US011021603B2

(12) United States Patent
Liao et al.

(10) Patent No.: US 11,021,603 B2
(45) Date of Patent: Jun. 1, 2021

(54) WHITE POLYESTER FILM WITH PROPERTIES OF LIGHTWEIGHT AND LOW-SHRINKAGE

(71) Applicant: NAN YA PLASTICS CORPORATION, Taipei (TW)

(72) Inventors: Te-Chao Liao, Taipei (TW);
Wen-Cheng Yang, Taipei (TW);
Chun-Che Tsao, Taipei (TW);
Chia-Yen Hsiao, Taipei (TW);
Chih-Feng Wang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 227 days.

(21) Appl. No.: 16/238,661

(22) Filed: Jan. 3, 2019

(65) Prior Publication Data
US 2020/0216661 A1    Jul. 9, 2020

(51) Int. Cl.
| | | |
|---|---|---|
| *B32B 27/08* | (2006.01) |
| *B32B 27/18* | (2006.01) |
| *B32B 27/20* | (2006.01) |
| *B32B 27/32* | (2006.01) |
| *B32B 27/36* | (2006.01) |
| *B32B 3/26* | (2006.01) |
| *C08F 8/00* | (2006.01) |
| *C08F 8/06* | (2006.01) |
| *C08K 3/013* | (2018.01) |
| *C08K 3/22* | (2006.01) |
| *C08K 3/26* | (2006.01) |
| *C08K 3/30* | (2006.01) |
| *C08L 23/10* | (2006.01) |
| *C08L 23/12* | (2006.01) |
| *C08L 23/14* | (2006.01) |
| *C08L 23/26* | (2006.01) |
| *C08L 23/30* | (2006.01) |
| *C08L 67/00* | (2006.01) |
| *C08L 67/03* | (2006.01) |
| *C08J 5/18* | (2006.01) |

(52) U.S. Cl.
CPC .............. *C08L 67/03* (2013.01); *B32B 27/08* (2013.01); *B32B 27/18* (2013.01); *B32B 27/32* (2013.01); *B32B 27/36* (2013.01); *C08J 5/18* (2013.01); *B32B 3/26* (2013.01); *B32B 27/20* (2013.01); *B32B 27/205* (2013.01); *B32B 2250/03* (2013.01); *B32B 2250/24* (2013.01); *B32B 2250/40* (2013.01); *B32B 2264/02* (2013.01); *B32B 2264/025* (2013.01); *B32B 2264/10* (2013.01); *B32B 2264/102* (2013.01); *B32B 2264/104* (2013.01); *B32B 2264/1022* (2020.08); *B32B 2264/12* (2013.01); *B32B 2307/402* (2013.01); *B32B 2307/41* (2013.01); *B32B 2307/416* (2013.01); *B32B 2307/72* (2013.01); *B32B 2307/734* (2013.01); *B32B 2323/10* (2013.01); *B32B 2367/00* (2013.01); *C08F 8/00* (2013.01); *C08F 8/06* (2013.01); *C08J 2367/03* (2013.01); *C08J 2423/30* (2013.01); *C08J 2467/03* (2013.01); *C08K 3/013* (2018.01); *C08K 2003/2241* (2013.01); *C08K 2003/265* (2013.01); *C08K 2003/3045* (2013.01); *C08L 23/10* (2013.01); *C08L 23/12* (2013.01); *C08L 23/14* (2013.01); *C08L 23/26* (2013.01); *C08L 23/30* (2013.01); *C08L 67/00* (2013.01); *C08L 2023/40* (2013.01); *C08L 2023/42* (2013.01); *C08L 2023/44* (2013.01); *C08L 2203/16* (2013.01); *C08L 2205/22* (2013.01); *C08L 2207/02* (2013.01); *Y10T 428/249953* (2015.04); *Y10T 428/249986* (2015.04); *Y10T 428/25* (2015.01); *Y10T 428/256* (2015.01); *Y10T 428/258* (2015.01); *Y10T 428/31786* (2015.04)

(58) Field of Classification Search
None
See application file for complete search history.

(56) References Cited

U.S. PATENT DOCUMENTS

| | | | | |
|---|---|---|---|---|
| 4,247,667 A | * | 1/1981 | Nojiri | ........................ C08F 4/32 525/254 |
| 4,678,834 A | * | 7/1987 | Boivin | ..................... C08J 3/226 523/205 |
| 5,082,869 A | * | 1/1992 | Braga | .................... C08J 9/0061 521/134 |

(Continued)

FOREIGN PATENT DOCUMENTS

JP             60-217207 A    * 10/1985

OTHER PUBLICATIONS

JP 60-217207 A (Haraguchi et al) (published Oct. 30, 1985) full English translation (1985) (Year: 1985).*

*Primary Examiner* — Vivian Chen
(74) *Attorney, Agent, or Firm* — Li & Cai Intellectual Property (USA) Office

(57) ABSTRACT

A white polyester film with a specific weight of 0.6-1.2 has a three-layered structure containing two outer layers (A) having a combined thickness taking up 2% to 30% of an overall thickness of the film and a middle layer (B), and having air-bubble cells in both the outer layers (A) and the middle layer (B). The outer layers (A) are formed from a polyester resin and inorganic particles. The middle layer (B) is formed of a polyester resin, modified polypropylene resin having a heat distortion temperature above 120° C. and a melt flow index (MI) of 0.2-1 g/10 minutes (at 230° C., with a load of 2.16 kg) via crosslinking with 0.1-3 wt % of peroxide with respect to the weight of the polypropylene resin, and inorganic particles.

9 Claims, No Drawings

(56) References Cited

U.S. PATENT DOCUMENTS

| | | | | |
|---|---|---|---|---|
| 5,422,175 A * | 6/1995 | Ito | B29C 55/005 | 428/304.4 |
| 5,672,409 A * | 9/1997 | Miyakawa | B32B 27/18 | 428/141 |
| 6,096,684 A * | 8/2000 | Sasaki | C08J 5/18 | 503/227 |
| 6,287,680 B1 * | 9/2001 | Sasaki | C08J 5/18 | 428/317.9 |
| 6,437,049 B1 * | 8/2002 | Bortolon | C08F 255/02 | 525/240 |
| 6,465,547 B1 * | 10/2002 | Jackson | C08F 8/42 | 264/210.5 |
| 6,828,010 B2 * | 12/2004 | Kubota | B32B 27/36 | 428/213 |
| 9,074,062 B2 * | 7/2015 | Satpathy | C08F 255/02 | |
| 2001/0044497 A1 * | 11/2001 | Myers | C07C 407/006 | 525/263 |
| 2003/0113465 A1 * | 6/2003 | Baumann | H02K 3/30 | 427/425 |
| 2004/0242773 A1 * | 12/2004 | Satoh | C08L 53/00 | 525/88 |
| 2005/0112351 A1 * | 5/2005 | Laney | F21V 7/28 | 428/304.4 |
| 2005/0121620 A1 * | 6/2005 | Laney | C09K 11/02 | 250/483.1 |
| 2010/0285302 A1 * | 11/2010 | Yoshida | B32B 27/20 | 428/317.9 |
| 2012/0320600 A1 * | 12/2012 | Ohira | G02B 5/0284 | 362/296.01 |
| 2014/0316022 A1 * | 10/2014 | Han | G02B 1/04 | 521/138 |
| 2015/0361231 A1 * | 12/2015 | Li | B29C 55/143 | 524/423 |
| 2017/0137620 A1 * | 5/2017 | Iwanaga | C08F 291/02 | |
| 2017/0267817 A1 * | 9/2017 | Yalcin | B29C 41/22 | |
| 2019/0084206 A1 * | 3/2019 | Deguchi | B29C 48/022 | |

* cited by examiner

WHITE POLYESTER FILM WITH PROPERTIES OF LIGHTWEIGHT AND LOW-SHRINKAGE

BACKGROUND OF THE INVENTION

1. Field of the Invention

The present invention relates to a white polyester film having a porous structure excellent whiteness, and low shrinkage. The film is small in specific weight, resistant to tear, highly printable, optically shading, durable, economic and environmentally friendly, and is a suitable material for labels, stickers, posters, recording paper and packaging.

2. Description of Related Art

Synthetic paper has better strength, folding endurance, whiteness, ad water resistance as compared to natural paper. Since it remains intact after soaked in water and has good printability, synthetic paper has been extensively used in publications, books, maps, calendars, cards, labels, stickers, posters and similar applications where waterproofing is required.

Synthetic paper is mainly made of organic resins such as polyethylene, polypropylene, polystyrene, and polyester. Therein, polyester is particularly popular for it has excellent heat tolerance and mechanical strength, and can work with various primers to better bonding with ink of customers' choice.

To make polyester films containing air-bubble cells, masterbatch is prepared with some certain incompatible material added therein, so that after biaxial extension, the product will have air bubbles formed along the incompatible material. Consequently, the polyester film has a lowered specific weight, and as the air-bubble cells so formed scatter light, the polyester film looks white.

To make polyester films lightweight, as disclosed by Japan Patent Application No. H6-269995, for example, polyolefin resins and polystyrene resins are preferable incompatible materials. While polypropylene and polystyrene resins have cost advantages, they are less tolerant to heat, so the film is more subject to distortion during extension. Consequently, the resulting film is less lightweight and suffers to significant longitudinal shrinkage. As the film tends to have warpage during laser printing, it is not suitable for printing applications.

Polymethyl pentene (TPX) and cyclic olefin copolymer (COC) have been successively introduced into manufacturing of polyester films for improving heat tolerance and facilitating good lightweightness and reflectivity. However, their expensiveness leads to increased manufacturing costs. They may be applicable to reflective sheets, but are not suitable for synthetic paper.

SUMMARY OF THE INVENTION

The object of the present invention is to provide a lightweight, low-shrinkage, white film, which has a specific weight of 0.6-1.2, a longitudinal shrinkage rate smaller than 1%, and good dimensional stability, so it suitable for ink-printing and laser printing applications.

The present invention combines a particular modified polypropylene resin with inorganic particles, and limits the particle size of modified polypropylene for longitudinal extension, so as to prevent the modified polypropylene from distortion during extension and thermosetting, thereby obtaining a polyester film that is lightweight, low-shrinkage and white and is unlikely to have warpage during laser printing.

According to the present invention, a lightweight, low-shrinkage, white polyester film is of an A-B-A three-layered structure. The polyester film is characterized in each of the outer layers (A) being composed of 65-95 wt % of a polyester resin and 5-35 wt % of inorganic particles (with respect to a total composition amount of the layer A); and the middle layer (B) being composed of 50-90 wt % of a polyester resin, 5-25 wt % of a modified polypropylene resin, and 5-25 wt % of inorganic particles (with respect to a total composition amount of the layer B), wherein the thickness of the layers A (i.e. a combined thickness of the two outer layers (A) takes up 2% to 30% of the overall thickness of the polyester film.

The modified polypropylene resin is to be prepared beforehand and satisfies the following conditions: (1) being modified using 0.1-3 wt % of a peroxide cross-linking agent with respect to a weight of the underlying polypropylene resin, (2) having a heat distortion temperature above 120° C., and (3) having a melt flow index (MI) of 0.2-1 g/10 min at 230° C. with a load of 2.16 kg.

DETAILED DESCRIPTION OF THE INVENTION

According to the present invention, a lightweight, low-shrinkage, white polyester film has at least three layers, or, is of an A-B-A structure.

The polyester film is characterized in that two outer layers (A) and a middle layer (B); all have air-bubble cells. Each of the outer layers (A) is composed of 65-95 wt % of a polyester resin and 5-35 wt % of inorganic particles. The middle layer (B) is composed of 50-90 wt % of a polyester resin, 5-25 wt % of a modified polypropylene resin, and 5-25 wt % of inorganic particles.

The modified polypropylene resin satisfies the following conditions:
(1) being modified using 0.1-3 wt % of a peroxide cross-linking agent with respect to a weight of the underlying polypropylene resin,
(2) having a heat distortion temperature above 120° C., and
(3) having a melt flow index (MI) of 0.24 g/10 min. at 230° C. with a load of 2.16 kg.

In the present invention, the polyester used in the outer layers (A) and the middle layer (B) of the lightweight, low-shrinkage, white polyester film may be homopolyester or copolyester. The polyester refers to a compound made by having a diol and a dicarboxylic acid react in a condensation polymerization process. The diol may be one or more of ethylene glycol, polytertmethylene, polytetramethylene ether glycol, cyclohexanediol, diethylene glycol, and neopentyl glycol. The dicarboxylic acid may be one or more of terephthalic acid, isophthalic acid, phthalic acid, adipic acid, sebacic acid and naphthalenedicarboxylic acid. Each of the diol and the dicarboxylic acid may be the foregoing used separately or in combination. In the present invention, the polyester is preferably polyethylene terephthalate or polyethylene naphthalate.

In the disclosed lightweight, low-shrinkage, white polyester film, the outer layers (A) contain inorganic particles. The inorganic particle may be one or more selected from silicon oxide, barium sulfate, calcium carbonate, titanium dioxide, kaolin, talcum powder, zeolite, alumina, and zinc sulfide. The inorganic particles have an average grain size (D50) of 0.05-5 μm, preferably of 0.1-2 μm, and more preferably of 0.2-1 µm. From the perspectives of lightweightness and low shrinkage, barium sulfate, calcium carbonate and titanium dioxide are preferred. The inorganic particles may be the foregoing used separately or in combination. The inorganic particle may be added into and well mixed with the polyester resin in advance to form a masterbatch for uniform distribution.

Based on its total composition amount, the outer layer (A) preferably has the inorganic particles added in the amount of 5-35 wt %. When the amount of the inorganic particles is less than 5 wt %, since cells are not adequately formed, the resulting lightweightness is not satisfying, yet when the amount is more than 35 wt %, the too many open cells at the surfaces can prevent the film from good formation.

The disclosed lightweight, low-shrinkage, white polyester film is lightweight thanks to the air-bubble cells formed throughout the film. These cells are well formed when the polyester and then incompatible resin distributed finely and evenly during extension (e.g. biaxial extension). Such extension form cells (air bubbles) around the incompatible resin.

The middle layer (B) is made of a specially modified polypropylene resin as the incompatible resin. The modified polypropylene resin must have a heat distortion temperature higher than 120° C. Otherwise, the modified polypropylene rinse can distort during extension and fail to form the desired cells.

The modified polypropylene resin is a propylene homopolymer or a copolymer of propylene and one or more α-olefins. In the present invention, the polypropylene (PP) may be a polypropylene homopolymer (PP-H), a polypropylene block copolymer (PP-B), or a polypropylene random copolymer (PP-R). Particularly, the polypropylene resin has a melt flow index (MI) of 0.5-15 g/10 min, preferably of 1-10 g/10 min, and more preferably of 3-8 g/10 min.

The modified polypropylene resin is modified using a peroxide cross-linking agent. When the manufacturing process reaches the decomposition temperature of the peroxide, the peroxide begins to decompose, making the cross-linking agent react with the polypropylene resin to form free radicals, which facilitate crosslinking and the formation of a net-like structure, so as to significantly enhance the physical properties of the polypropylene resin product, such as heat tolerance and tensile strength.

In the present invention, the cross-linking agent used may be the following compounds [followed by their respective decomposition temperatures (in ° C.)]: succinic acid peroxide (110° C.), benzoyl peroxide (110° C.), tert-butylperoxy-2-etylhecanoate (113° C.), p-chlorobenzoyl peroxide (115° C.), tert-butyl peroxyisobutyrate (115° C.), tert-butylperoxy isopropyl (135° C.), dodecaneperoxoic acid tert-butyl ester (140° C.), 2,5-dimethyl-2,5-di(butyl peroxy)hexane (140° C.), tert-butyl peroxyacetate (140° C.), tert-butyl perbenzoate peroxide, di-tert-butyl peroxyphthalate (140° C.), tert-butyl monoperoxymaleate (140° C.), cyclohexanone peroxide (145° C.), tert-butyl peroxy benzoate (145° C.), dicumyl peroxide (150° C.), methyl-2,5-di(tert-butylperoxy)hexane (155° C.), tert-butyl hydroperoxide (158° C.), di-tert-butyl peroxide (160° C.), 2,5-dimethyl-2,5-di(tertiary-butylperoxy)-hexyne (170° C.) and α, α'-bis(t-butylperoxy-m-isopropyl)-benzene (160° C.). The preferable choices are α, α'-bis(t-butylperoxy-m-isopropyl)-benzene and 2,5-dimethyl-2,5-di(tertiary-butylperoxy)-hexyne for they have higher decomposition temperatures, and make it easy to control the physical properties of the modified polypropylene resin and the appearance of the product. The cross-linking agent is preferably added in an amount of 0.1-3 wt % of the polypropylene resin, and more preferably of 0.3-1.5 wt %.

The auxiliary crosslinking agent helps peroxide crosslinking or free-radical crosslinking by increasing the crosslink density, and may include compounds of diolefin, triolefin, and tertolefin having two terminal C—C double bonds. In the present invention, it is one or more selected from: 1,9-decadiene, 1,7-octadiene, 1,5-hexadiene, 1,4-pentadiene, 1,3-butadiene, 1,3,5-hexatriene, and 2,3-dimethyl-1,3-butadiene. The auxiliary crosslinking agent used in the present invention is trimethylolpropane triacrylate.

The polypropylene and peroxide are mixed and melted before extruded by a single screw extruder or twin-screw extruder to produce modified polypropylene resin pellets. Therein, a twin-screw extruder provides more preferable effects in mixing and dispersion. Other resins or rubber may be added as additives during melting and extrusion as required.

In the present invention, the modified polypropylene resin is preferably one having a melt flow index (MI) of 0.2-1 g/10 min. Where MI is higher than 1 g/10 min, the polypropylene particles tend to have distortion, making it difficult to form cells. When the MI is lower than 0.1 g/10 min, the polypropylene particles have poorer dispersivity. In this case, though cells of larger sizes can be formed to achieve lightweightness, since the cells are not uniform in size, the resulting light-shielding performance is inconsistent and the film forming properties are relatively poor.

The melt flow index (MI) refers to the value measured according to ISO1133 at 230° C. with a load of 2.16 kg.

The modified polypropylene resin is added in an amount of 5-25 wt % with respect to the total composition amount of the middle layer (B), and preferably of 8-15 wt %. Where the adding amount of the modified polypropylene resin is less than 5 wt %, cell formation is insufficient and the desirable lightweightness is unachievable. On the other hand, where the adding amount of the modified polypropylene resin is more than 25 wt %, the film forming properties tend to degenerate, thus being undesirable.

The modified polypropylene resin may be mixed with the polyester resin in advance for better dispersion. Alternatively, it may be added directly during the film making process. Mixing in advance is nevertheless preferable, for this ensures that the modified polypropylene resin disperse across the polyester stably, and in turn uniform formation of cells during film-making extension, leading to good light-shielding performance, lightweightness, low shrinkage and manufacturing stability.

In the disclosed lightweight, low-shrinkage, white polyester film, the middle layer (B) has inorganic panicles for further improving the modified polypropylene resin in terms of heat tolerance. This helps to prevent the modified polypropylene resin from distortion after extension, so the cells are well kept to contribute to good lightweightness. The inorganic particles may be of, for example, silicon oxide, barium sulfate, calcium carbonate, titanium dioxide, kaolin, talcum powder, zeolite, alumina, or zinc sulfide, without limitation. Therein, from the perspective of lightweightness, the preferable choices are barium sulfate, calcium carbonate, and titanium dioxide. The inorganic particles may be any of the above separately or in combination. The inorganic particles may be added into the polyester resin or the modified polypropylene resin in advance. Preferably, the inorganic particles are pre-added in the modified polypropylene resin to further improve the modified polypropylene resin in terms of heat tolerance, thereby contributing to better lightweightness after extension.

The adding amount of the inorganic particles in the middle layer (B) is preferably 5-25 wt % with respect to the total composition amount of the middle layer (B). Where the adding amount is less than 5 wt %, the inorganic particles can fail to effectively help the modified polypropylene with cell formation, leading to poor lightweightness and inferior light-shielding performance. Where the adding amount is more than 25 wt %, since there are too many open cells at the surfaces of the film, the film has poor mechanical strength. The inorganic particle have an average grain size (D50) of 0.05-5 µm, preferably of 0.1-2 µm, and more preferably of 0.2-1 µm. The disclosed lightweight, low-shrinkage, white polyester film is of a three-layered A-B-A structure. The thickness of the outer layers (A) (the combined thickness of the two outer layers) preferably takes up 2% to 30% of the overall thickness of the film, and more preferably takes up 5% to 15%. When the thickness of the outer layer (A) was less than 2%, the cells in the middle layer will be too large to provide shielding effects, resulting in film break and poor dimensional stability. On the other hand, when the thickness of the outer layer (A) was greater than 30%, it is difficult to achieve desired lightweightness.

In addition to the foregoing substances, the disclosed lightweight, low-shrinkage, white polyester film may contain other additives. These additives may be, for example, an antioxidant, a heat stabilizer, a matting agent, a pigment, a UV absorber, a fluorescent whitening agent, a plasticizer or other additives. Particularly, for suppressing oxidation and deterioration of the modified polypropylene resin, an antioxidant or a heat stabilizer is preferably used.

The disclosed lightweight, low-shrinkage, white polyester film may further receive surface resin coating or corona treatment, so as to improve ink adhesion. The resin coating may be made in any known way and the resin used may be one or more of a polyester resin, a polyurethane resin, a propylene acid resin, a polyethylene resin, a polypropylene resin, a polyamide resin, and a fluorine resin, for improving ink adhesion.

While the following description is directed to a film-making process that may be implemented in the present invention, it is understood that the present invention is not limited thereto. The polyester, the modified polypropylene and the inorganic panicles are well mixed, dried and introduced into an extruder B that has been preheated to 270 to 300° C., and melted in a polymer B. Then the polyester and the inorganic particles are fed into an extruder A that has been preheated to 270 to 300° C. to be melted into a polymer A. Afterward, the two masterbatches are extruded using a three-layered T die into an un-extended sheet of an A-B-A structure. The sheet is cooled and cured on rollers in to an un-extended film.

The un-extended film is afterward heated using rollers and infrared rays. Longitudinal extension is achieved using speed difference between two or more rollers, so as to produce a longitudinally extended film. The temperature of the longitudinal extension process has to be higher than the glass transition temperature (Tg) of the polyester in the middle layer (B). The longitudinal extension rate is preferably 2.5-4.0, and more preferably 2.7-3.5. Where the extension rate is less than 2.5, the desired cell formation and in turn lightweightness are unachievable cells. An extension rate greater than 4.0 has adverse effects on the strength of the film, making the film tend to break during the film-making process. Then the longitudinally extended film is help by clips for latitudinal extension. During this process, pre-shrinkage treatment is performed. Then the film is thermally set into the disclosed lightweight, low-shrinkage, white polyester film. The temperature of the latitudinal extension has to be higher than the glass transition temperature (Tg) of the polyester in the middle layer (B). The latitudinal extension rate is preferably 2.5-4.0, and more preferably 2.7-3.5. Where the extension rate is less than 2.5, the desired cell formation and in turn lightweightness are unachievable cells. An extension rate greater than 4.0 has adverse effects on the strength of the film, making the film tend to break during the film-making process.

The temperature of the thermal setting process is preferably 180-240° C., and more preferably 200-220° C. Where the temperature is lower than 180° C., the film is undesirably subject to significant heat shrinkage. Where the temperature is higher than 240° C., though the resulting film has less shrinkage, the modified polypropylene can distort, compromising lightweightness.

The disclosed lightweight, low-shrinkage, white polyester film has to be of a three-layered A-B-A structure. The combined thickness of the two outer layers (A) takes up 2% to 30% of the overall thickness of the film.

The disclosed lightweight, low-shrinkage, white polyester film preferably has a specific weight of 0.6-1.2, and more preferably of 0.80-1.15. Where the specific weight is below 0.8, there will be so many cells that the film is weak in strength and less printable. On the other hand, when the specific weight is greater than 1.2, lightweightness is unachievable. While the following examples are described in detail for illustrating the present invention, it is understood that the present invention is not limited thereto.

1. Melt Flow Index (MI)

MI is measured according to ISO-1133 at 230° C., with a load of 2.16 kg.

2. The Heat Distortion Temperature is Measure According to the Criteria as Set Forth in ASTM D648.

3. Test for Specific Weight

The film is cut into a square sized 5.0 cm×5 cm and measured using a Jolly balance modeled Precisa XS225A-SG.

4. Test for Heat Shrinkage Rate

In an oven of 150° C., the film is baked for 30 minutes in its un-tensioned state. The distance between markers is measured before and after the film is heated, and the longitudinal (MD) shrinkage rate and the latitudinal (TD) shrinkage rate are calculated using the following equation:

Heat shrinkage rate %=(($L0-L$)/$L0$)×100;

wherein L0: the distance between markers before baked;
L: the distance between markers after baked at 150° C. for 30 minutes.

5. Film Forming Properties

The film is extended longitudinally by 2.8-3.4 times, latitudinally by 3.0-3.5 times and held for 8 hr to see Whether the film is stable and free of breakage.

As shown in Table 1, the modified polypropylene resin was prepared beforehand:

A. Modified Polypropylene Resin 1 (PP1)

100 parts by weight of polypropylene, 0.3 parts by weight of 2,5-dimethyl-di(tertiary-butylperoxy)-hexyne, and 0.05 parts by weight of trimethylolpropane triacrylate were mixed and melted using a twin-screw extruder to produce a modified polypropylene PP1, having a heat distortion temperature of 125° C., and its MI=1 g/10 min.

B. Modified Polypropylene Resin 2 (PP2)

100 parts by weight of polypropylene, 1 parts by weight of 2,5-dimethyl-2,5-di(tertiary-butylperoxy)-hexyne, and 0.05 parts by weight of trimethylol propane triacrylate were mixed and melted using a twin-screw extruder to produce a modified polypropylene PP2, having a heat distortion temperature of 130° C., and its MI=0.4 g/10 min.

C. Modified Polypropylene Resin 3 (PP3)

100 parts by weight of polypropylene, 0.05 parts by weight of 2,5-dimethyl-2,5-di(tertiary-butylperoxy)-hexyne, and 0.05 parts by weight of trimethylolpropane triacrylate were mixed and melted using a twin-screw extruder to produce a modified polypropylene PP3, having a heat distortion temperature of 115° C., and its MI=3 g/10 min.

D. Modified Polypropylene Resin 4 (PP4)

100 parts by weight of polypropylene, 5 parts by weight of 2,5-dimethyl-2,5-di(tertiary-butylperoxy)-hexyne, and 0.05 parts by weight of trimethylolpropane triacrylate were mixed and melted using a twin-screw extruder to produce a modified polypropylene PP4, having a heat distortion temperature of 135° C., and its MI=0.1 g/10 min.

Example 1

90 wt % of polyethylene terephthalate resin (PET) and 10 wt % of titanium dioxide ($TiO_2$) were used to make the outer layers (A), while 80 wt % of polyethylene terephthalate resin, 10 wt % of the modified polypropylene resin 1, and 10 wt % of titanium dioxide were used to make the middle layer (B). The materials were mixed and melted at 290° C. before extruded through a three-layered T die to form an A-B-A structure. The extruded article was then longitudinally and latitudinally extended and thermally set into a film. The combined thickness of the two outer layers (A) is 25 μm, and the thickness of the layers (B) is 225 μm.

This polyester film was tested for its physical properties and the results are shown in Table 2.

Example 2

A film of an A-B-A structure was produced using the method as described in Example 1, with the materials of the middle layer (B) changed to 85 wt % of polyethylene terephthalate resin, 5 wt % of the modified polypropylene resin 1 and 10 wt % of titanium dioxide. The combined thickness of the two outer layers (A) is 25 μm, and the thickness of the layers (B) is 225 μm.

This polyester film was tested for its physical properties and the results are shown in Table 2.

Example 3

A film of an A-B-A structure was produced using the method as described in Example 1, with the materials of the middle layer (B) changed to 75 wt % of polyethylene terephthalate resin, 15 wt % of the modified polypropylene resin 1 and 10 wt % of titanium dioxide. The combined thickness of the two outer layers (A) is 25 μm, and the thickness of the layers (B) is 225 μm.

This polyester film was tested for its physical properties and the results are shown in Table 2.

Example 4

A film of an A-B-A structure was produced using the method as described in Example 1, with the materials of the middle layer (B) changed to 75 wt % of polyethylene terephthalate resin, 15 wt % of the modified polypropylene resin 2 and 10 wt % of titanium dioxide. The combined thickness of the two outer layers (A) is 25 μm, and the thickness of the layers (B) is 225 μm.

This polyester film was tested for its physical properties and the results are shown in Table 2.

Example 5

A film of an A-B-A structure was produced using the method as described in Example 1, with the materials of the outer layers (A) changed to 90 wt % of polyethylene terephthalate resin and 10 wt % of barium sulfate ($BaSO_4$), and the materials of the middle layer (B) changed to 80 wt % of the polyethylene terephthalate resin, 10 wt % of the modified polypropylene resin 1 and 10 wt % of barium sulfate.

This polyester film was tested for its physical properties and the results are shown in Table 2. The combined thickness of the two outer layers (A) is 25 μm, and the thickness of the layers (B) is 225 μm.

Example 6

A film of an A-B-A structure was produced using the method as described in Example 1, with the materials of the outer layers (A) changed to 90 wt % of the polyethylene terephthalate resin and 10 wt % of barium sulfate, and the materials of the middle layer (B) changed to 70 wt % of the polyethylene terephthalate resin, 10 wt % of the modified polypropylene resin 1 and 20 wt % of barium sulfate.

This polyester film was tested for its physical properties and the results are shown in Table 2. The combined thickness of the two outer layers (A) thickness is 25 μm, and the thickness of the layers (B) is 225 μm.

Example 7

A film of an A-B-A structure was produced using the method as described in Example 1, with the materials of the outer layers (A) changed to 90 wt % of the polyethylene terephthalate resin and 10 wt % of calcium carbonate (CaCO3), and the materials of the middle layer (B) changed to 80 wt % of the polyethylene terephthalate resin, 10 wt % of the modified polypropylene resin 1 and 10 wt % of calcium carbonate. The combined thickness of the two outer layers (A) is 25 μm, and the thickness of the layers (B) is 225 μm.

This polyester film was tested for its physical properties and the results are shown in Table 2.

Example 8

A film of an A-B-A structure was produced using the method as described in Example 1, with the materials of the outer layers (A) changed to 90 wt % of a polyethylene naphthalate resin (PEN) and 10 wt % of titanium dioxide, and the materials of the middle layer (B) changed to 80% of the polyethylene naphthalate resin, 10 wt % of the modified polypropylene resin 1 and 10 wt % of titanium dioxide. The combined thickness of the two outer layers (A) is 25 μm, and the thickness of the layers (B) is 225 μm.

This polyester film was tested for its physical properties and the results are shown in Table 2.

Comparative Example 1

A film of an A-B-A structure was produced using the method as described in Example 1, with the materials of the middle layer (B) changed to 80% of polyethylene terephthalate resin, 10 wt % of the modified polypropylene resin 3 and 10 wt % of titanium dioxide. The combined thickness of the two outer layers (A) is 25 μm, and the thickness of the layers (B) is 225 μm.

This polyester film was tested for its physical properties and the results are shown in Table 2.

Comparative Example 2

A film of an A-B-A structure was produced using the method as described in Example 1, with the materials of the middle layer (B) changed to 80% of polyethylene terephthalate resin, 10 wt % of the modified polypropylene resin 4 and 10 wt % of titanium dioxide. The combined thickness of the two outer layers (A) is 25 μm, and the thickness of the layers (B) is 225 μm.

This polyester film was tested for its physical properties and the results are shown in Table 2.

Comparative Example 3

A film of an A-B-A structure was produced using the method as described in Example 1, with the materials of the middle layer (B) changed to 60% of the polyethylene terephthalate resin, 30 wt % of the modified polypropylene resin 1 and 10 wt % of titanium dioxide. The combined thickness of the two outer layers (A) is 25 μm, and the thickness of the layers (B) is 225 μm.

This polyester film was tested for its physical properties and the results are shown in Table 2.

Comparative Example 4

A film of an A-B-A structure was produced using the method as described in Example 1, with the materials of the middle layer (B) changed to 90% of polyethylene terephthalate resin, 10 wt % of the modified polypropylene resin 1. The combined thickness of the two outer layers (A) is 25 μm, and the thickness of the layers (B) is 225 μm.

This polyester film was tested for its physical properties and the results are shown in Table 2.

Comparative Example 5

A film of an A-B-A structure was produced using the method as described in Example 1, but with the combined thickness of the outer layers (A) changed to 3 μm, and the thickness of the layers (B) changed to 247 μm.

This polyester film was tested for its physical properties and the results are shown in Table 2.

Comparative Example 6

A film of an A-B-A structure was produced using the method as described in Example 1, and the materials of the middle layer (B) changed to 80 μm, and the thickness of the layers (B) changed 170 μm.

This polyester film was tested for its physical properties and the results are shown in Table 2

TABLE 1

| Preparation of modified polypropylene resins Unit: parts in weight | | | | |
|---|---|---|---|---|
| | PP1 | PP2 | PP3 | PP4 |
| Polypropylene resin | 100 | 100 | 100 | 100 |
| 2,5-dimethyl-2,5-di(tertiary-butylperoxy)-hexyne | 0.3 | 1 | 0.05 | 5 |
| Trimethylolpropane triacrylate | 0.05 | 0.05 | 0.05 | 0.05 |
| Heat distortion temperature ° C. | 125 | 130 | 115 | 135 |
| MI (g/10 min) | 1 | 0.4 | 3 | 0.1 |

* Notes:
Thickness (μm): a combined thickness of the upper and lower layers.
PP1: the modified polypropylene resin 1, having a heat distortion temperature 125° C., and its MI = 1 g/10 min;
PP2: modified polypropylene resin 2, having a heat distortion temperature 130° C., and its MI = 0.4 g/10 min;
PP3: modified polypropylene resin 3, having a heat distortion temperature 115° C., and its MI = 3 g/10 min;
PP4: modified polypropylene resin 4, having a heat distortion temperature 135° C., and its MI = 0.1 g/10 min.

TABLE 2

| | | Components in compositions in weight ratios | | | | | | | |
|---|---|---|---|---|---|---|---|---|---|
| | | Example | | | | | | | |
| | | 1 | 2 | 3 | 4 | 5 | 6 | 7 | 8 |
| Layer A | PET (%) | 90 | 90 | 90 | 90 | 90 | 90 | 90 | |
| | PEN (%) | | | | | | | | 90 |
| | TiO2 (%) | 10 | 10 | 10 | 10 | | | | 10 |
| | BaSO4 (%) | | | | | 10 | 10 | | |
| | CaCO3 (%) | | | | | | | 10 | |
| | *Thickness (μm) | 25 | 25 | 25 | 25 | 25 | 25 | 25 | 25 |
| Layer B | PET (%) | 80 | 85 | 75 | 75 | 80 | 70 | 80 | |
| | PEN (%) | | | | | | | | 80 |
| | *PP1 (%) | 10 | 5 | 15 | | 10 | 10 | 10 | 10 |
| | *PP2 (%) | | | | 15 | | | | |
| | *PP3 (%) | | | | | | | | |
| | *PP4 (%) | | | | | | | | |
| | TiO2 (%) | 10 | 10 | 10 | 10 | | | | 10 |
| | BaSO4 (%) | | | | | 10 | 20 | | |
| | CaCO3 (%) | | | | | | | 10 | |
| | Thickness (μm) | 225 | 225 | 225 | 225 | 225 | 225 | 225 | 225 |

TABLE 2-continued

| Components in compositions in weight ratios | | | | | | | | | |
|---|---|---|---|---|---|---|---|---|---|
| Specific weight | | 0.80 | 1.10 | 0.78 | 0.70 | 0.76 | 0.67 | 1.02 | 0.85 |
| Heat shrinkage | MD(%) | 0.85 | 0.80 | 0.92 | 0.80 | 0.87 | 0.89 | 0.97 | 0.88 |
| | TD(%) | 0.21 | 0.20 | 0.22 | 0.18 | 0.28 | 0.27 | 0.31 | 0.21 |
| Extension film forming properties | | ○ | ○ | ○ | ○ | ○ | ○ | ○ | ○ |

| | | Comparative Example | | | | | |
|---|---|---|---|---|---|---|---|
| | | 1 | 2 | 3 | 4 | 5 | 6 |
| Layer A | PET (%) | 90 | 90 | 90 | 90 | 90 | 90 |
| | PEN (%) | | | | | | |
| | TiO2 (%) | 10 | 10 | 10 | 10 | 10 | 10 |
| | BaSO4 (%) | | | | | | |
| | CaCO3 (%) | | | | | | |
| | *Thickness (μm) | 25 | 25 | 25 | 25 | 3 | 80 |
| Layer B | PET (%) | 80 | 80 | 60 | 90 | 80 | 80 |
| | PEN (%) | | | | | | |
| | *PP1 (%) | | | 30 | 10 | 10 | 10 |
| | *PP2 (%) | | | | | | |
| | *PP3 (%) | 10 | | | | | |
| | *PP4 (%) | | 10 | | | | |
| | TiO2 (%) | 10 | 10 | 10 | | 10 | 10 |
| | BaSO4 (%) | | | | | | |
| | CaCO3 (%) | | | | | | |
| | Thickness (μm) | 225 | 225 | 225 | 225 | 247 | 170 |
| Specific weight | | 1.30 | 0.70 | 0.57 | 1.27 | 0.77 | 1.23 |
| Heat shrinkage | MD(%) | 1.50 | 1.05 | 1.10 | 1.80 | 1.08 | 0.77 |
| | TD(%) | 0.28 | 0.23 | 0.6 | 0.55 | 0.28 | 0.25 |
| Extension film forming properties | | X | X | X | ○ | X | ○ |

Results

1. It is learnt by comparing Example 1 with Example 3 that increase in the adding amount of the modified polypropylene further decreased specific weight and contributed to lightweightness. However, in Comparative Example 3 where the adding amount of the modified polypropylene was the greatest, while the film is lightest, the film forming properties are poor.

2. It is learnt by comparing Example 1 with Comparative Example 1 that when the modified polypropylene had a heat distortion temperature lower than 120° C. and an MI not smaller than 1, the modified polypropylene showed distortion during extension and failed to achieve desired lightweightness.

3. It is learnt by comparing Examples 3 and 4 with Comparative Example 2 that increase in the heat distortion temperature of the modified polypropylene prevented distortion during extension and achieved better lightweightness. However, in each of the Comparative Examples, the modified polypropylene having its MI to low led to uneven formation of cells during the film-making process, leading to relatively poor film forming properties that prevent normal manufacturing.

4. It is learnt by comparing Example 1 with Comparative Example 4 that without adding inorganic particles in the middle layer (B), the resulting film had its specific weight remain high and failed to achieve lightweightness.

5. It is learnt by comparing Example 1 with Comparative Examples 5 and 6 that when the thickness of the outer layers (A) was less than 2%, the cells in the middle layer were so large that film break happed and the resulting film was less dimensionally stabile. On the other hand, when the thickness of the outer layer (A) was greater than 30%, the resulting film was not lightweight.

6. In each of the Examples, only when the modified polypropylene resin was added in the middle layer (B), the resulting film was lightweight and showed good film forming properties.

7. It is learnt by comparing Examples 1-8 with Comparative Examples 1-6 in terms of heat shrinkage rate that Examples 1-8 showed less shrinkage and thus had good dimensional stability.

8. The film of Comparative Example 5 had its layer A only as thick as 1.2% (opposite to 2% or more) of the overall thickness of the film, the cells in the middle layer led to film break and poor dimensional stability. The film of Comparative Example 6 had its layer A take up 32% (opposite to 30% or less) of the overall thickness of the film, and was not lightweight.

The invention claimed is:

1. A white polyester film with lightweight and low-shrinkage, having a specific weight ranging between 0.6 and 1.2, being of three-layered structure containing two outer layers (A) having a combined thickness taking up 2% to 30% of an overall thickness of the polyester film and a middle layer (B), being characterized in a longitudinal thermal shrinkage rate smaller than 1% after baking at 150° C. for 30 minutes, and having air-bubble cells in both the outer layers (A) and the middle layer (B),
   each of the outer layers (A) being composed of, with respect to a total composition amount of the layer (A), 65-95 wt % of a polyester resin and 5-35 wt % of inorganic particles, wherein the inorganic particles have an average grain size (D50) of 0.05-5 μm; and
   the middle layer (B) being composed of, with respect to a total composition amount of the layer B, 50-90 wt % of a polyester resin, 5-25 wt % of a modified polypropylene resin, and 5-25 wt % of inorganic particles, wherein the inorganic particles have an average grain size (D50) of 0.05-5 μm and the modified polypropylene resin satisfies the following conditions:
   (1) being modified using 0.1-3 of wt % a peroxide cross-linking agent with respect to a weight of the underlying polypropylene resin, (2) having a heat distortion temperature above 120° C., and (3) having a melt flow index (MI) of 0.2-1 g/10 minutes measured at 230° C. with a load of 2.16 kg.

2. The white polyester film of claim 1, wherein the inorganic particles in the outer layers (A) and in the middle layer (B) are one or more selected from the group consisting of barium sulfate, calcium carbonate and titanium dioxide.

3. The white polyester film of claim 1, wherein the polyester resins in the outer layers (A) and in the middle layer (B) are polyethylene terephthalate or polyethylene naphthalate.

4. The white polyester film of claim 1, wherein the peroxide cross-linking agent is selected from α, α'-bis(t-butylperoxy-m-isopropyl)-benzene or 2,5-dimethyl-2,5-di(tertiary-butylperoxy)-hexyne.

5. The white polyester film of claim 1, wherein the inorganic particles are pre-added in the polyester resin or the modified polypropylene resin.

6. The white polyester film of claim 1, wherein the inorganic particle in the outer layers (A) and in the middle layer (B) have and average grain size (D50) of 0.2-1 μm.

7. The white polyester film of claim 1, wherein the modified polypropylene resin of the middle layer (B) is a propylene homopolymer or a copolymer of propylene and α-olefin.

8. The white polyester film of claim 1, wherein the modified polypropylene resin of the middle layer (B) is added in an amount equal to 8-15 wt % of the total composition amount of the middle layer (B).

9. The white polyester film of claim 1, wherein the two outer layers (A) have a combined thickness taking up 5% to 15% of the overall thickness of the polyester film.

* * * * *